(12) United States Patent
Dahouk et al.

(10) Patent No.: US 12,270,572 B2
(45) Date of Patent: Apr. 8, 2025

(54) SYSTEMS AND METHODS FOR CONTROLLING INDOOR AIR QUALITY WITH A FLUID MOVING APPARATUS

(71) Applicant: REGAL BELOIT AMERICA, INC., Beloit, WI (US)

(72) Inventors: Mohamad Khalil Dahouk, Fort Wayne, IN (US); Roger Carlos Becerra, Fort Wayne, IN (US); Zachary Joseph Stauffer, Fort Wayne, IN (US); Ludovic Andre Chretien, Columbia City, IN (US); Michael David Smith, Rogers, AR (US); Scott A. Coonrod, Fort Wayne, IN (US); Ramin Rezaei, Centerville, OH (US)

(73) Assignee: Regal Beloit America, Inc., Milwaukee, WI (US)

( * ) Notice: Subject to any disclaimer, the term of this patent is extended or adjusted under 35 U.S.C. 154(b) by 984 days.

(21) Appl. No.: 17/100,326

(22) Filed: Nov. 20, 2020

(65) Prior Publication Data
US 2022/0065470 A1   Mar. 3, 2022

Related U.S. Application Data

(60) Provisional application No. 62/706,561, filed on Aug. 25, 2020.

(51) Int. Cl.
*F24F 8/192* (2021.01)
*F24F 11/30* (2018.01)
(Continued)

(52) U.S. Cl.
CPC .............. *F24F 8/192* (2021.01); *F24F 11/30* (2018.01); *F24F 11/77* (2018.01); *F24F 13/08* (2013.01); *F24F 8/22* (2021.01); *F24F 2110/50* (2018.01)

(58) Field of Classification Search
CPC .. F24F 8/192; F24F 11/30; F24F 11/77; F24F 13/08; F24F 8/22; F24F 2110/50;
(Continued)

(56) References Cited

U.S. PATENT DOCUMENTS

| 4,993,172 | A | * | 2/1991 | Allen | ..................... A45D 20/16 |
| | | | | | 34/90 |
| 5,997,619 | A | * | 12/1999 | Knuth | ................ B01D 46/0038 |
| | | | | | 55/385.2 |

(Continued)

FOREIGN PATENT DOCUMENTS

| CN | 109289072 A | * | 2/2019 | ............... A61L 9/18 |
| CN | 110167605 A | | 8/2019 | |
| EP | 3385710 A1 | * | 10/2018 | .......... F24F 11/0001 |

*Primary Examiner* — Stephen Hobson
(74) *Attorney, Agent, or Firm* — Armstrong Teasdale LLP

(57) ABSTRACT

One aspect of the disclosure includes a fluid moving system. The fluid moving system includes a fluid moving apparatus configured to convey a fluid through a housing from an inlet to an outlet. The fluid moving system includes an active cleaning device configured to neutralize or remove at least a portion of an undesired matter from the fluid conveyed through the housing. The fluid moving system includes an electric motor including a rotor coupled to the fluid moving apparatus and configured to turn the fluid moving apparatus upon application of electric power to a stator of the electric motor. The fluid moving system includes a motor controller communicatively coupled to the electric motor and configured to control at least one of a speed output or a torque output thereof.

18 Claims, 14 Drawing Sheets

(51) Int. Cl.
*F24F 11/77* (2018.01)
*F24F 13/08* (2006.01)
*F24F 8/22* (2021.01)
*F24F 110/50* (2018.01)

(58) Field of Classification Search
CPC ........ F24F 11/61; F24F 11/64; F24F 2110/10; F24F 2110/20; F24F 2110/64; F24F 2110/66; F24F 2110/70; F24F 2110/72; Y02A 50/20; Y02B 30/70
See application file for complete search history.

(56) References Cited

U.S. PATENT DOCUMENTS

| | | | | |
|---|---|---|---|---|
| 8,203,124 | B2* | 6/2012 | Havens | A61L 2/10 250/455.11 |
| 8,235,776 | B2* | 8/2012 | Stanimirovic | F24F 11/30 454/256 |
| 8,685,329 | B2* | 4/2014 | Lee | A61L 2/26 422/120 |
| 8,974,565 | B2* | 3/2015 | Cecchi | B01D 46/44 55/482 |
| 9,694,452 | B2* | 7/2017 | Karamanos | F28F 9/002 |
| 9,939,163 | B2* | 4/2018 | Meirav | G05B 15/02 |
| 2005/0279059 | A1* | 12/2005 | Lee | B01D 46/46 55/356 |
| 2006/0150819 | A1* | 7/2006 | Yuen | A61L 9/22 96/224 |
| 2007/0181000 | A1* | 8/2007 | Wilson | F24F 11/77 96/134 |
| 2008/0265179 | A1* | 10/2008 | Havens | A61L 2/10 250/492.1 |
| 2009/0312905 | A1* | 12/2009 | Marra | B60H 3/0608 700/276 |
| 2010/0135850 | A1* | 6/2010 | Helenius | A61L 9/20 422/4 |
| 2010/0219258 | A1* | 9/2010 | Starcic | A61L 2/22 239/289 |
| 2010/0219259 | A1* | 9/2010 | Starcic | A61L 2/22 239/289 |
| 2012/0234166 | A1* | 9/2012 | Markham | F24F 6/18 95/149 |
| 2013/0255285 | A1* | 10/2013 | Kocher-Kunz | B60H 3/00 62/331 |
| 2013/0291735 | A1* | 11/2013 | Livchak | F24F 1/0047 165/48.1 |
| 2014/0097266 | A1* | 4/2014 | Habbel | B65D 83/262 239/69 |
| 2014/0203100 | A1* | 7/2014 | Ben Haim | A61L 9/14 239/8 |
| 2014/0216259 | A1* | 8/2014 | Iwaki | F24F 11/64 96/18 |
| 2015/0053366 | A1* | 2/2015 | Melsheimer | E04H 14/00 165/10 |
| 2015/0064069 | A1* | 3/2015 | Yi | A61L 9/20 422/121 |
| 2015/0273381 | A1* | 10/2015 | Stoner, Jr. | B01D 46/62 96/418 |
| 2015/0285524 | A1* | 10/2015 | Saunders | F24F 11/62 454/239 |
| 2015/0359921 | A1* | 12/2015 | Palmer | A61L 9/20 422/4 |
| 2016/0083272 | A1* | 3/2016 | Rajagopalan | C02F 1/325 250/435 |
| 2016/0143181 | A1* | 5/2016 | De Felice | F24F 11/46 700/278 |
| 2016/0317685 | A1* | 11/2016 | Pujol | A61M 16/0666 |
| 2016/0361677 | A1* | 12/2016 | Blackley | A61L 9/00 |
| 2016/0367712 | A1* | 12/2016 | Robert | A61L 9/22 |
| 2017/0028820 | A1* | 2/2017 | Walsh | B60H 3/0608 |
| 2017/0067659 | A1* | 3/2017 | Silver | B01D 46/0032 |
| 2017/0122607 | A1* | 5/2017 | Son | F24F 13/20 |
| 2017/0197493 | A1* | 7/2017 | Paranhos | A61L 2/10 |
| 2017/0333837 | A1* | 11/2017 | Bender | B01D 53/32 |
| 2018/0038611 | A1* | 2/2018 | Lau | G05D 23/1931 |
| 2018/0065126 | A1* | 3/2018 | Abate | B60H 3/0633 |
| 2018/0172291 | A1* | 6/2018 | Conrad | F24F 6/12 |
| 2019/0141179 | A1* | 5/2019 | Dushane | F24F 11/58 |
| 2019/0167833 | A1* | 6/2019 | Yang | F24F 8/108 |
| 2019/0201572 | A1* | 7/2019 | Code | A01N 59/12 |
| 2019/0203971 | A1* | 7/2019 | Iio | F24F 11/0001 |
| 2019/0240371 | A1* | 8/2019 | Benedek | B01D 53/8675 |
| 2020/0346157 | A1* | 11/2020 | Burdeinyi, Jr. | B01D 46/446 |
| 2023/0272799 | A1* | 8/2023 | Brisenheim | F24F 11/77 417/423.7 |
| 2024/0191891 | A1* | 6/2024 | Abizeid | A61L 9/014 |

* cited by examiner

SYSTEMS AND METHODS FOR CONTROLLING INDOOR AIR QUALITY WITH A FLUID MOVING APPARATUS

CROSS-REFERENCE TO RELATED APPLICATIONS

The present application claims the benefit of and priority to U.S. Provisional Patent Application Ser. No. 62/706,561, filed Aug. 25, 2020, and entitled "SYSTEMS AND METHODS FOR CONTROLLING INDOOR AIR QUALITY WITH A FLUID MOVING APPARATUS," the disclosure of which is hereby incorporated by reference in its entirety.

FIELD

The field of the disclosure relates generally to a fluid moving system and, more specifically, a fluid moving apparatus for controlling indoor air quality (IAQ).

BACKGROUND

Indoor air quality (IAQ) generally refers to the air quality within and around buildings and structures, such as, for example, single-family homes, apartments, commercial and industrial buildings, or office buildings. IAQ is typically determined by collecting and testing air samples, monitoring human exposure to pollutants, or collection and testing of samples or deposits on building surfaces. Computer modeling of air flow within and around buildings may also be incorporated into an IAQ determination.

IAQ can be quantified in various measurable ways. For example, by identifying the existence of particulate matter, volatile organic compounds (VOCs), carbon monoxide, carbon dioxide, or other airborne pollutants. Temperature and humidity conditions can also correlate to IAQ. Moreover, the existence of specific biologic matter, such as airborne bacterial or viral particulates, can impact IAQ and the functional utility of a given space.

IAQ can conventionally be maintained in and around a given indoor space with the addition of disinfectant, sterilizing, filtering, purifying, or other air processing systems to mitigate airborne pollutants.

BRIEF DESCRIPTION

One aspect of the disclosure includes a fluid moving system. The fluid moving system includes a fluid moving apparatus configured to convey a fluid through a housing from an inlet to an outlet. The fluid moving system includes an active cleaning device configured to neutralize or remove at least a portion of an undesired matter from the fluid conveyed through the housing. The fluid moving system includes an electric motor including a rotor coupled to the fluid moving apparatus and configured to turn the fluid moving apparatus upon application of electric power to a stator of the electric motor. The fluid moving system includes a motor controller communicatively coupled to the electric motor and configured to control at least one of a speed output or a torque output thereof.

Another aspect of the disclosure includes a method for operating a fluid moving system. The method includes conveying, using a fluid moving apparatus, a fluid through a housing from an inlet to an outlet. The method further includes removing, using an active cleaning device, at least a portion of an undesired matter from the fluid conveyed through the housing. The method further includes turning, using an electric motor including a rotor coupled to the fluid moving apparatus, the fluid moving apparatus upon application of electric power to a stator of the electric motor. The method further includes controlling, using a motor controller communicatively coupled to the electric motor, at least one of a speed output or a torque output of the electric motor.

Yet another aspect of the disclosure includes a heating, ventilation, and air conditioning (HVAC) system. The HVAC system includes a fluid conduit and a fluid moving system coupled in flow communication with said fluid conduit. The fluid moving system includes a fluid moving apparatus configured to convey a fluid through a housing from an inlet to an outlet. At least one of the inlet and the outlet is coupled in flow communication with said fluid conduit. The fluid moving system further includes an active cleaning device configured to neutralize or remove at least a portion of an undesired matter from the fluid conveyed through the housing. The fluid moving system further includes an electric motor including a rotor coupled to the fluid moving apparatus and configured to turn the fluid moving apparatus upon application of electric power to a stator of the electric motor. The fluid moving system further includes a motor controller communicatively coupled to said electric motor and configured to control at least one of a speed output or a torque output thereof.

DETAILED DESCRIPTION

Embodiments of the disclosed fluid moving system include a fluid moving apparatus integrated with an IAQ sensor and an active cleaning device, such as an Ultra Violet (UV) light source (e.g., UV-A, UV-B, or UV-C), ion generator, or electrostatic filtration device. An embodiment system includes, for example, a blower configured to move a fluid, such as air, from an inlet though an outlet of a fan housing, and an electric motor configured to turn the blower. The electric motor is a variable speed motor that enables, for example, continuously variable speed or discrete speed settings. Further, the electric motor may include an induction motor, a permanent split capacitor (PSC) motor, an electrically commutated motor (ECM), or any other suitable electric motor for operating the blower. The blower may include forward-curved, backward-curved, or radial blades. In alternative embodiments, the fluid moving apparatus includes a fan. In further alternative embodiments, the disclosed fluid moving system may utilize the active cleaning device to improve the quality of another fluid, such as water, and where the fluid moving apparatus includes an impeller. The disclosed system further includes a motor controller configured to control operation of the motor based on commands received from a system controller (e.g., a thermostat, a heating, ventilation, and air conditioning (HVAC) unit controller, or other computing system) and based on data received from sensors in communication with the motor controller. The fluid moving system, in certain embodiments, further includes an ultraviolet light source (sometimes referred to herein as a "UV unit") configured to emit UV radiation though air moving through the air moving system. The UV unit is configured for communication with and may be controlled by the motor controller. The integration of the active cleaning device onto the fluid moving system enables the cleansing of all circulated fluid at a central location. Moreover, circulated air can be monitored (e.g., by an IAQ sensor) and used as a feedback to control the speed and quantity of fluid moving across the active cleaning device to better regulate the cleaning effect of the active cleaning device.

Figure 1:
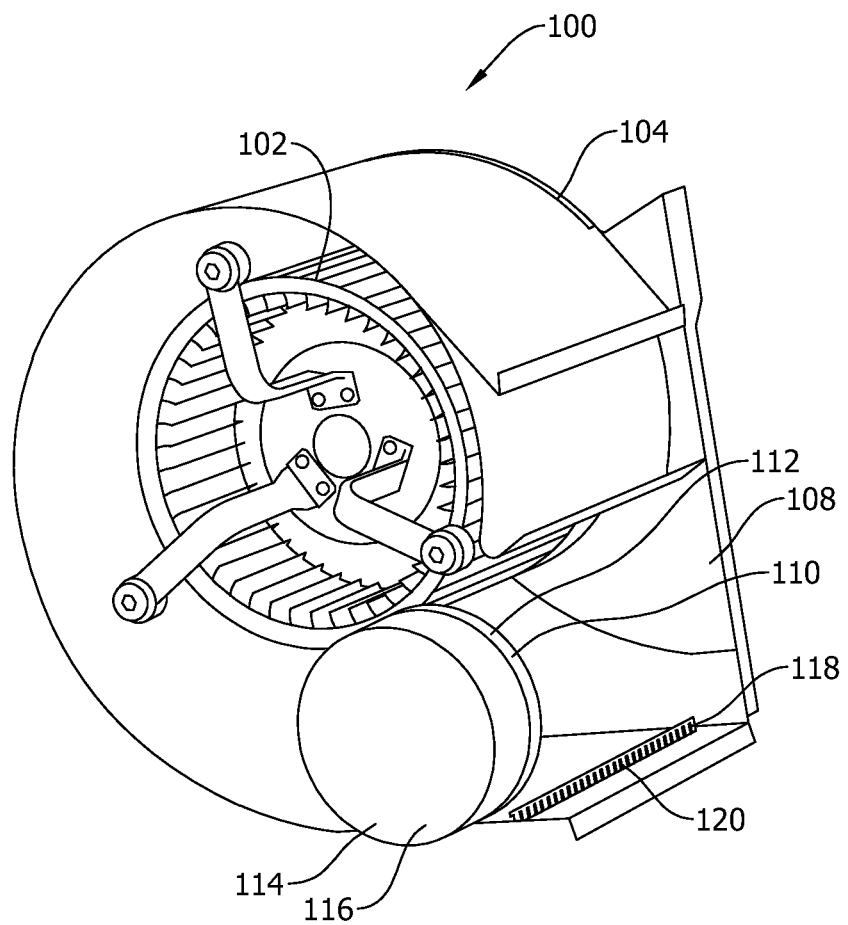
FIG. 1 is a perspective diagram of an example fluid moving system including an active cleaning device.
Figure 2:
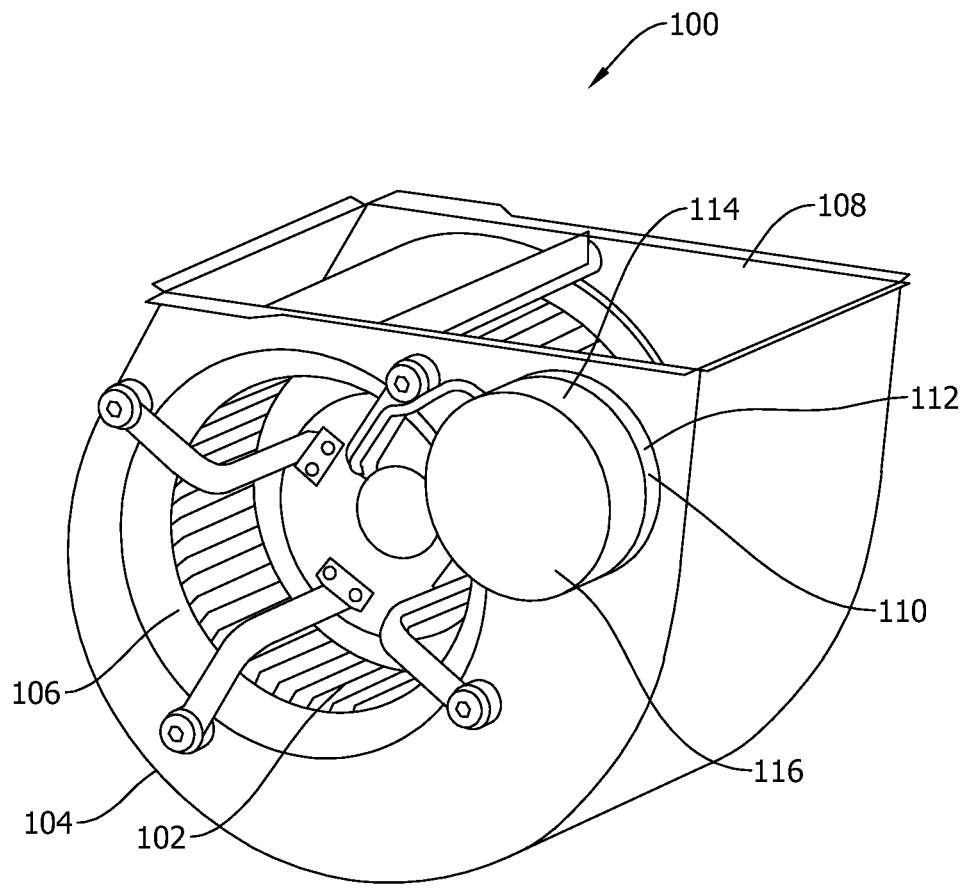
FIG. 2 is a perspective diagram of another example fluid moving system including an active cleaning device.
Figure 3:
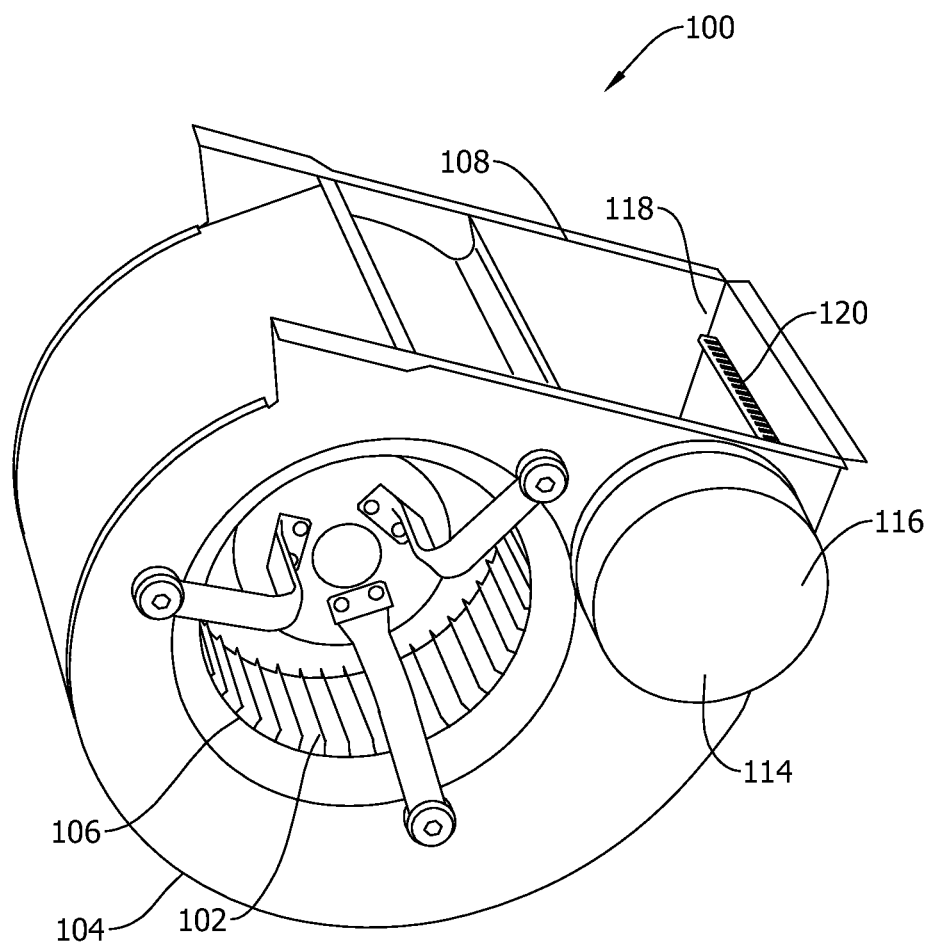
FIG. 3 is another perspective diagram of the fluid moving system shown in FIG. 1.
Figure 4:
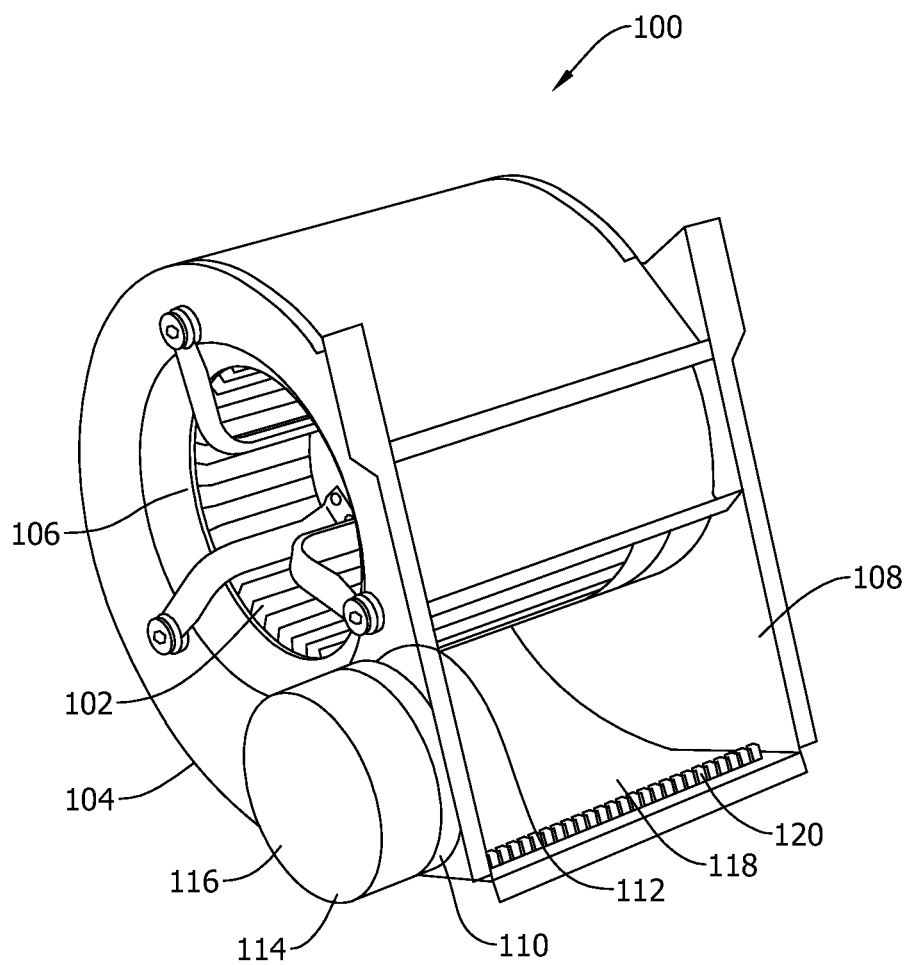
FIG. 4 is another perspective diagram of the fluid moving system shown in FIGS. 1 and 3.
Figure 5:
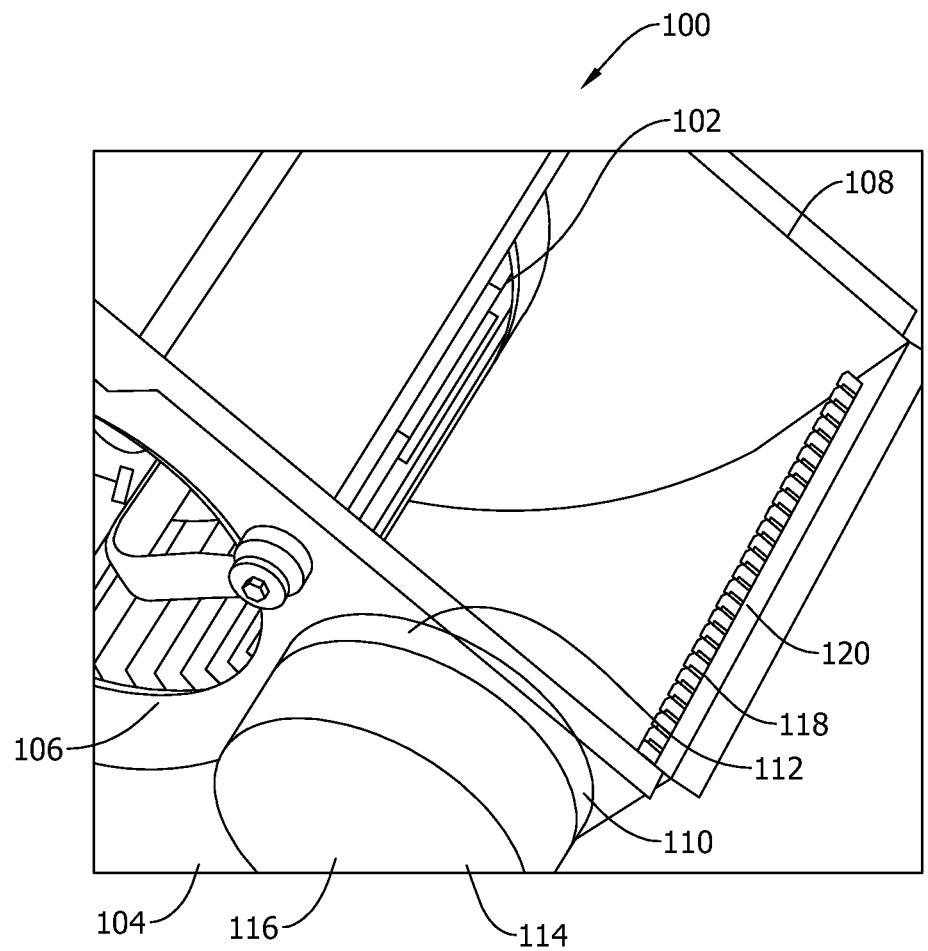
FIG. 5 is a perspective diagram of an example active cleaning device for use with the fluid moving apparatuses of FIGS. 1-4.
Figure 6:
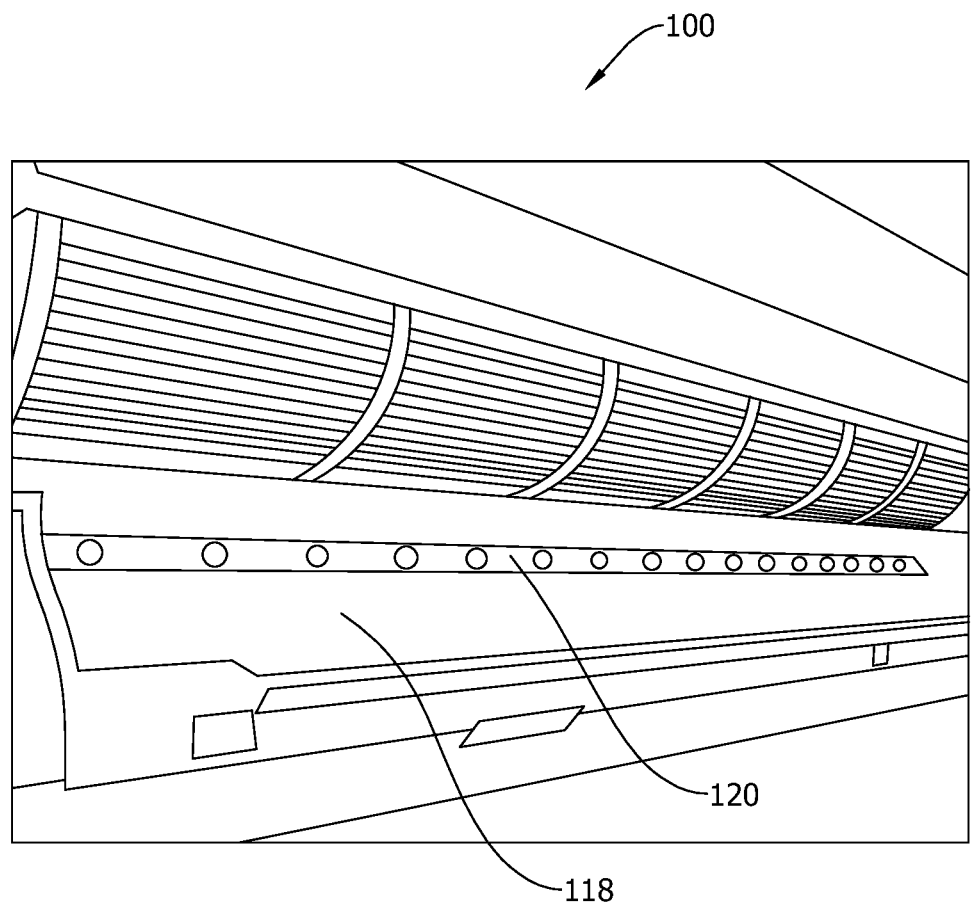
FIG. 6 is another perspective diagram of the active cleaning device shown in FIG. 5.

FIG. 1 is a partial cross-sectional view of an exemplary fluid moving apparatus and, more specifically, a blower system 100 configured to control indoor air quality (IAQ). Blower system 100 includes a blower wheel 102 disposed in a blower housing 104 having an inlet 106 and an outlet 108. Blower system 100 further includes an electric motor 110 configured to turn blower wheel 102 to cause a fluid such as air to move into blower housing 104 through inlet 106 and out of the blower housing 104 through outlet 108. In some embodiments, inlet 106 and outlet 108 are coupled in flow communication with an HVAC system.

Figure 10:
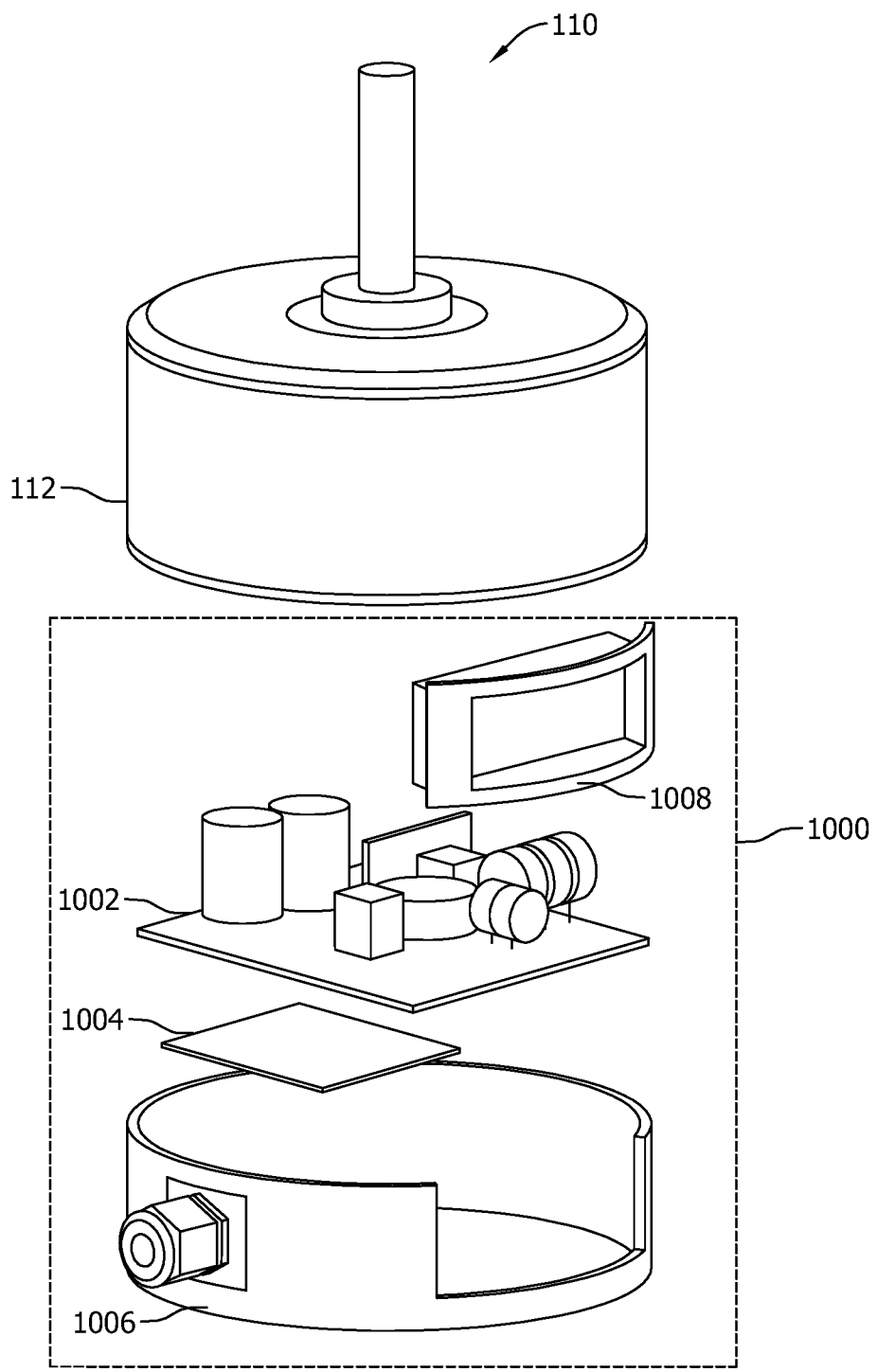
FIG. 10 is a disassembled view of an example electronics module for an electric motor including an indoor air quality sensor.

Electric motor 110 includes a rotor and a stator (not shown). In some embodiments, the rotor and the stator are disposed in a motor housing 112. The rotor is coupled to blower wheel 102 via a shaft (not shown), and is configured to rotate in response to a current present in windings of the stator. Electric motor 110 further includes a motor controller 114 configured to supply current to the windings of the stator to cause blower wheel 102 to rotate. Motor controller 114 is typically incorporated with the electric motor 110 and within motor housing 112 in an electronics enclosure (as shown in FIG. 10) or module. Alternatively, motor controller 114 may be external to electric motor 110 and positioned within a unit of equipment in which electric motor 110 is installed. Motor controller 114 may also be remote from electric motor 110 or the unit of equipment in which the motor is installed. For example, at least some motor control functions may be implemented on a remote control device or remote computing device external to electric motor 110 and external to the unit of equipment. In certain embodiments, certain components of motor controller 114 may be local to electric motor 110 or within motor housing 112, and other components may be external or remote. Likewise, some motor control functions may be embodied on local motor controller components (e.g., local power electronics or local digital electronics), and other motor control functions may be embodied on remote or external motor controller components (e.g., remote power electronics or remote digital electronics).

Figure 11:
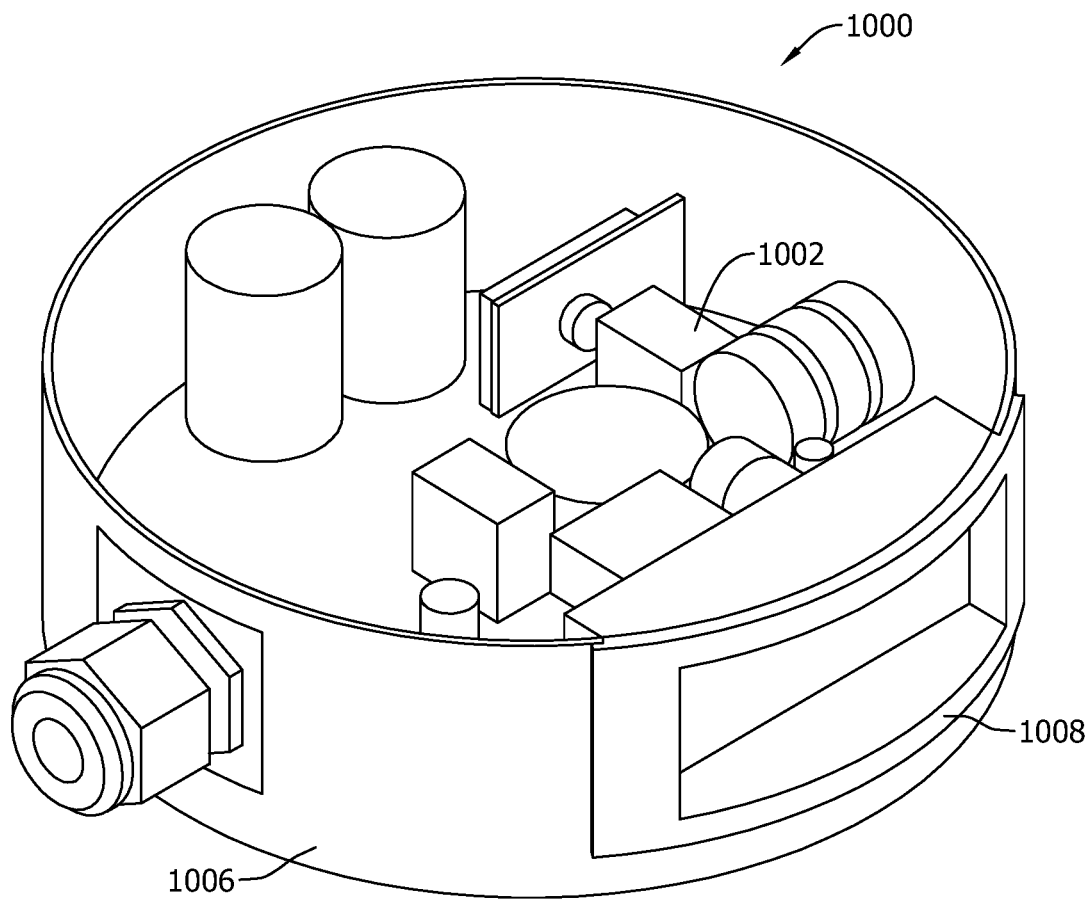
FIG. 11 is a schematic diagram of the electronics module shown in FIG. 10.

Motor controller 114 includes a processor (shown in FIG. 11) and an inverter configured to control the supply of current to the stator windings based on instruction from the processor. In some embodiments, motor controller 114 is configured for communication with a system controller (not shown), such as a thermostat, HVAC system controller, or other suitable computing device, such as, for example, a personal computer, laptop, smart phone, tablet computer, server, or cloud computing platform. In such embodiments, motor controller 114 may be configured, e.g., programmed or loaded with executable instructions, to operate blower system 100 based on, for example, a speed, torque, or airflow command received from the system controller. Electric motor 110 then operates, for example, by speed control, torque control, constant airflow, or constant mass flow. In some embodiments, motor controller 114 is disposed in a motor controller housing 116 that may be disposed adjacent to, attached to, or integrated with the motor housing 112. In some embodiments, blower system 100 is configured for self-cleaning or operation that minimizes the accumulation of dust on blower wheel 102 or within the blower system 100. For example, blower wheel 102 may include backward-curved blades, which resist the accumulation of dust.

The blower system 100 further includes at least one UV unit 118 configured to emit UV light capable of influencing an air quality of air moving through the fluid moving system. For example, the UV light may improve the air quality by killing pathogens or removing unwanted particles present in the air moving through the blower system 100. Accordingly, when coupled to an HVAC system, the blower system 100 can control an IAQ of a space treated by the HVAC system.

UV unit 118 is configured for communication with the processor of the motor controller 114, such that UV unit 118 responds to a control signal generated by motor controller 114. In response to the control signal, UV unit 118 is configured, for example, to activate, deactivate, or change an intensity of the UV light. For example, in some embodiments, UV motor controller 114 may activate UV unit 118 when a detected level of contaminants is greater than a threshold, or vary the intensity of the UV light as a function of the detected level. In some embodiments, UV unit 118 includes one or more light emitting diodes (LEDs) 120 or other elements configured to emit UV radiation in response to an electric signal. In some embodiments, the UV unit 118 is configured to receive power from a power supply of the motor controller, for example, via a wired direct current (DC) bus. Additionally or alternatively, UV unit 118 may be powered by an internal source, such as a battery.

UV unit 118 is positioned within blower system 100 such that UV light emitting by UV unit 118 treats a substantial portion of, such as substantially all of, the air moving through blower system 100. In some embodiments, UV 118 is disposed on or near motor controller 114, or integrated into motor controller 114, such as by being at least partially disposed on or within motor controller housing 116. In such embodiments, UV unit 118 may be configured for wired communication with motor controller 114, for example, via a control line (not shown) coupled between UV unit 118 and motor controller 114. In some embodiments, UV unit 118 is disposed remotely from the motor controller 114, for example, at one or more of inlet 106 and outlet 108 of the blower system, or on baffles disposed in a flow channel of blower system 100 (as described below with respect to FIG. 7). In some such embodiments, UV unit 118 is configured for wireless communication with motor controller 114. In some embodiments, blower housing 104 includes a window, and UV unit 118 is positioned external to the blower housing 104 and adjacent to the window, such that UV radiation emitted by UV unit 118 can enter blower housing 104. In some embodiments, additional UV units 118 may be disposed in other parts of an HVAC system in which blower system 100 is installed. In some embodiments, UV unit 118 is configured to be removable from blower system 100 to ease the process of repairing or replacing the UV unit 118 should UV unit 118 fail or exceed its operational lifetime.

In some embodiments, UV unit 118 is capable of emitting short-wave UV radiation, such as (UV-C). In some such embodiments, UV unit 118 emits UV-C having a wavelength between 200 nanometers and 208 nanometers, for example, at 254 nanometers. UV-C radiation is effective at destroying pathogens but potentially dangerous to humans or components of blower system 100. In such embodiments, UV unit 118 is positioned to limit a potential for humans or delicate components to be exposed to UV-C. In some embodiments, one or more interior surfaces of blower housing 104 are reflective to the UV radiation emitted by UV unit 118, which enhances the ability of the UV radiation to treat air moving through blower system 100. Alternatively, or in addition to, one or more components of blower system 100 may be composed of a material that diffuses UV radiation such that a more-uniform pattern of UV energy is generated. In some embodiments, UV unit 118 may additionally or alternatively be configured to emit UV-A, UV-B, or other types of radiation.

In some embodiments, motor controller 114 is configured to control UV unit 118 based on an operating mode commanded by the system controller. For example, in some embodiments, motor controller 114 is configured to operate in an "OFF" mode, a heating mode, a cooling mode, a constant fan mode, and a special air treatment mode, each mode having a corresponding blower speed or airflow. In some embodiments, UV unit 118 is active only when the motor controller us operating according to the air treatment mode. In alternative embodiments, no dedicated air treatment mode is present, and UV unit 118 is active when the motor controller is operating according to one or more of the constant fan mode or the other operating modes where air moves through blower system 100. When motor controller 114 operates in the air treatment mode, the motor controller is configured to operate blower wheel 102 at a speed where the effectiveness of UV unit 118 in treating the air is relatively high, such as when the airflow rate is relatively low while still sufficient for a substantial amount of air of the space to be treated. In some embodiments, motor controller 114 includes a mechanism configured to prevent an accidental activation of UV unit 118, such as when electric motor 110 is inactive and blower wheel 102 is not moving air through blower housing 104. For example, motor controller 114 may include or be coupled to UV unit 118 via an interlock switch, door switch, connector, or software device that is activated only when motor controller is operating electric motor 110, which causes UV unit 118 to operate only when blower wheel 102 is operating and air is moving through blower housing 104.

Figure 7:
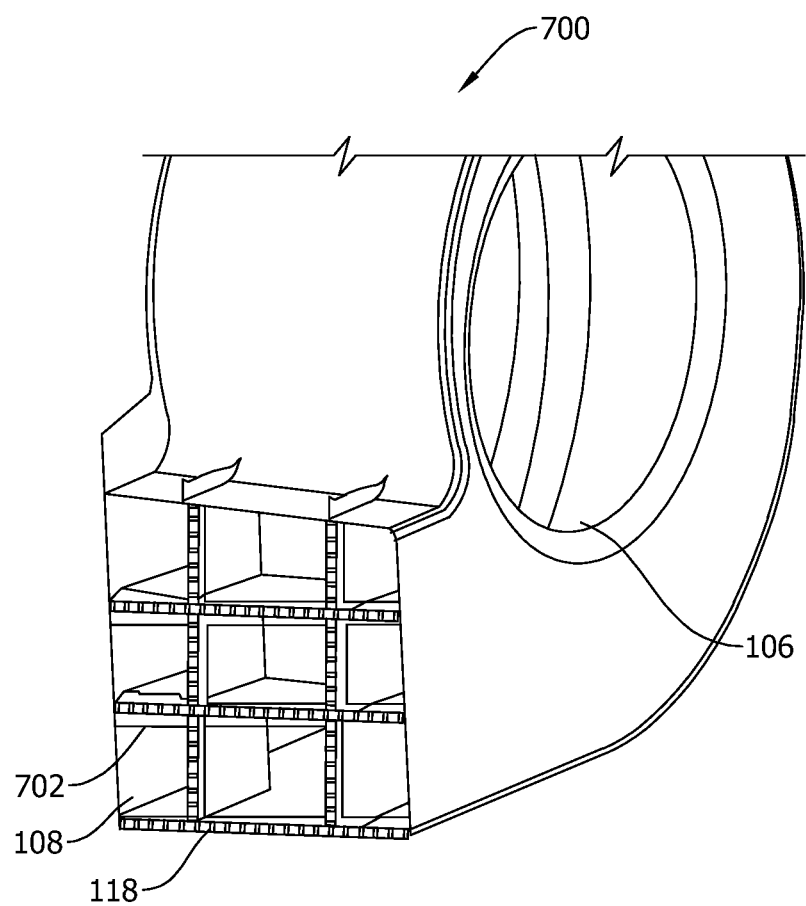
FIG. 7 is a schematic diagram of an example blower housing having a baffle on which an active cleaning device is mounted.
Figure 8:
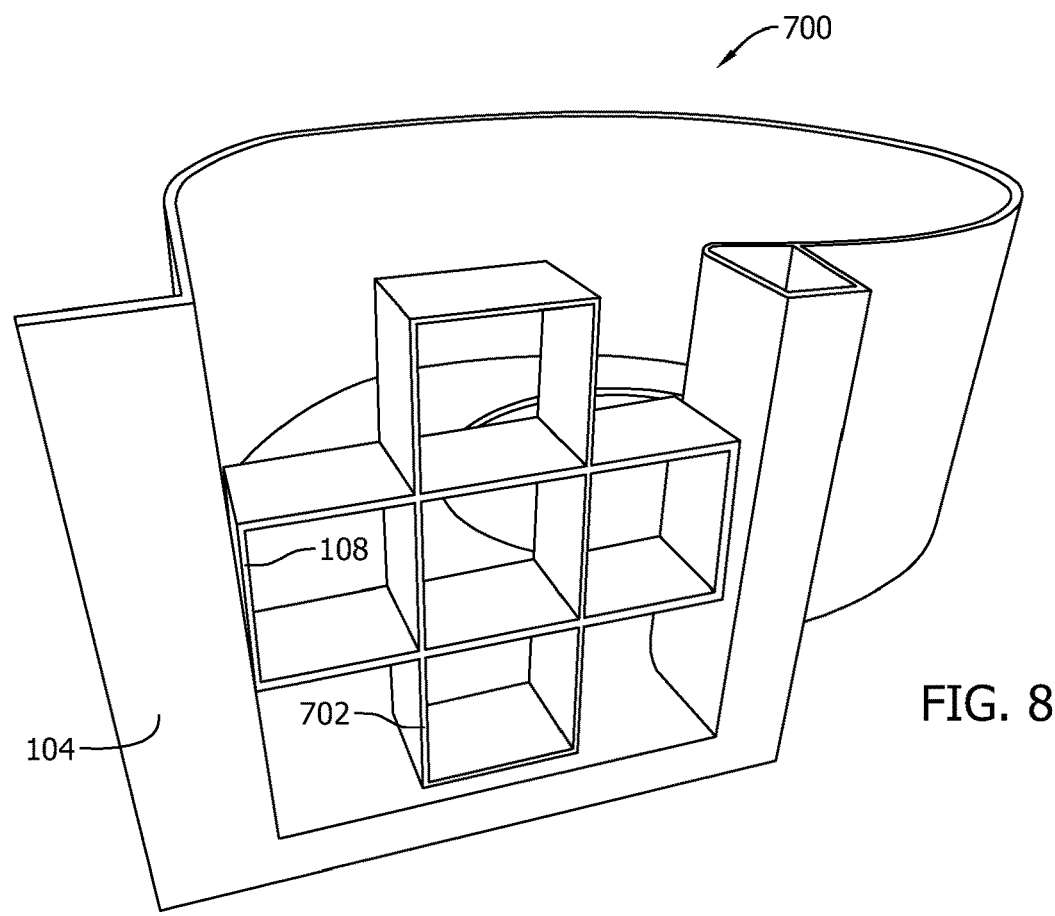
FIG. 8 is a perspective diagram of the blower housing shown in FIG. 7.

FIG. 7 is a schematic diagram of an example blower housing 700. FIG. 8 is a cross-sectional view of blower housing 700. Blower housing 700 generally functions as described with respect to blower housing 104, and includes one or more baffles 702 disposed in the airflow path between inlet 106 and outlet 108. In some embodiments, an active cleaning device such as UV unit 118 is mounted on one or more of baffles 702.

Figure 9:
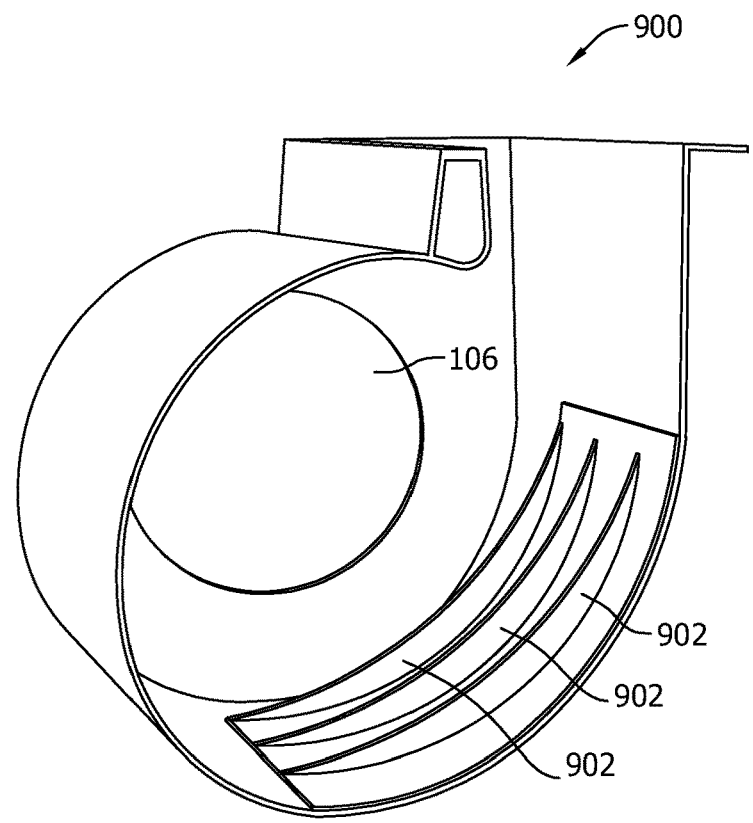
FIG. 9 is a perspective diagram of another example blower housing having a baffle on which an active cleaning device may be mounted.

FIG. 9 is perspective diagram of another example blower housing 900. Blower housing 900 generally functions as described with respect to blower housing 104, and includes one or more baffles 902 disposed in the airflow path between inlet 106 and outlet 108. In some embodiments, an active cleaning device is mounted on one or more of baffles 902.

FIG. 10 illustrates an example electric motor 110 including an electronics module 1000. In some embodiments, electronics module 1000 is an implementation of motor controller 114 (shown in FIG. 1). Electronics module 1000 includes power electronics 1002, a processor 1004, a housing 1006, and an input/output (I/O) interface 1008. Power electronics 1002 include electrical components such as capacitors, rectifiers, and switches, which enable power electronics 1002 to convert an input power signal to provide a signal suitable for powering the stator windings of electric motor 110. Processor 1004 is coupled in communication with power electronics 1002 and configured to control switches of power electronics 1002 to generate the signal for powering the stator windings. As described with respect to motor controller 114, in some embodiments, processor 1004 is further coupled in communication with UV unit 118 and further configured to control operation of UV unit 118. In some embodiments, power electronics 1002 and processor 1004 are disposed in housing 1006. I/O interface 1008 is disposed on a wall of housing 1006, and enables external devices such as UV unit 118 or sensors to be coupled in communication with processor 1004.

Figure 12:
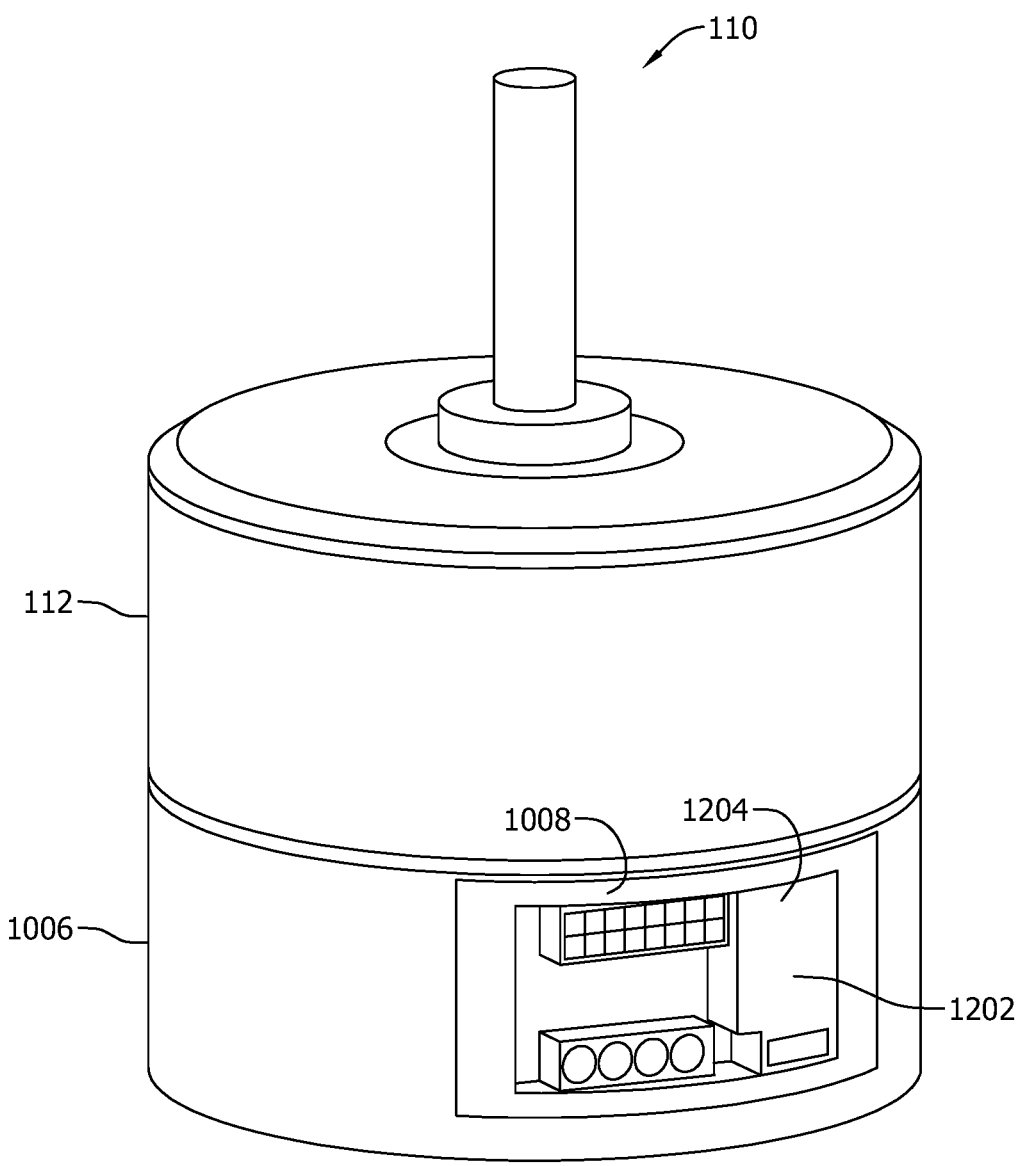
FIG. 12 is a schematic diagram of an example electric motor having an indoor air quality sensor.
Figure 13:
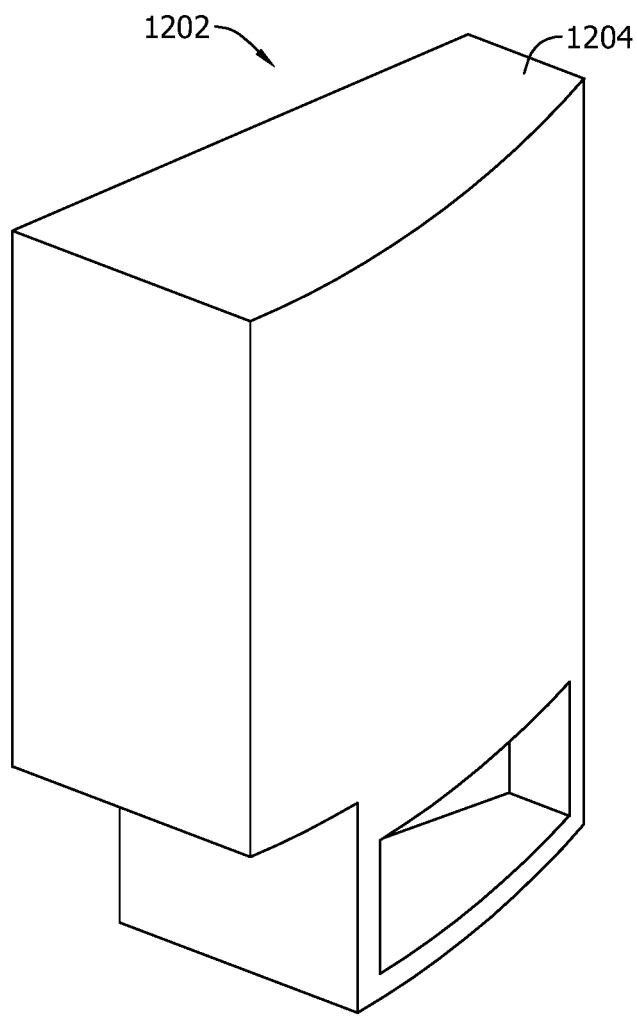
FIG. 13 is a schematic diagram of an example indoor air quality sensor.

As shown in FIG. 12, a sensor module 1202 including one or more sensors may be coupled to electronics module 1000, for example, at I/O interface 1008. The sensors of sensor module 1202 are configured for detecting properties of air moving through the blower system 100, for example, to measure a quality of the moving air. The sensors may include, for example, a particulate matter sensor, volatile organic compound sensor, a temperature sensor, a humidity sensor, a carbon monoxide sensor, a carbon dioxide sensor, or other sensors. The sensors are configured for communication with processor 1004, for example, using a wired or wireless connection, such as a near field communication (NFC) connection. In some embodiments, sensor module 1202 includes a sensor housing 1204 in which one or more of the sensors are disposed. In some embodiments, sensor module 1202 is coupled to or positioned adjacent to motor controller 114. In such embodiments, sensor module 1202 may be powered by motor controller 114, for example, via a wired DC bus or via a NFC connection. Additionally or alternatively, sensor module 1202 may be powered by an internal source, such as a battery. In some embodiments, data obtained from the sensors may be displayed, for example, at the system controller or via a mobile application ("app") executed by a user device in communication with the processor. In some embodiments, control parameters for the sensors, such as data sampling rates, are selected to achieve certain operating characteristics, such as reducing power consumption or data storage. In some embodiments, the blower system 100 may include additional sensors that generate diagnostic data, such as blockage sensors or vibration sensors, which may be disposed within or separate from sensor module 1202.

In some embodiments, motor controller 114 is configured to control the speed or torque of motor 110 based on the measured quality of the air or other data obtained from sensor unit 1202 or other sensors. In some embodiments, motor controller 114 is further configured to control operation of UV unit 118 based on the measured quality of the air or other data obtained from sensor unit 1202 or other sensors.

In certain embodiments, the motor controller 114, in addition to operating the blower system in an "OFF" mode, a heating mode, a cooling mode, a constant fan mode, or a special air treatment mode, may also periodically operate the blower to cycle, or circulate, fluid in the proximity of the sensor to ensure quality measurements represent the current conditions in and around the space, and to avoid stagnant fluid, or minimal fluid flow, in the proximity of sensor module 1202. In such embodiments the period between cycles may be configurable to suit a given implementation. For example, the motor controller 114 may circulate the fluid at least every five, ten, fifteen, thirty, or more minutes. Accordingly, sensor module 1202 enables new sampling and measurement of quality, e.g., IAQ, on the selected frequency, or period.

In some embodiments, processor 1004 may control one or more of electric motor 110 or the UV unit 118 based on data received from sensor module 1202. For example, if the sensors of sensor module 1202 detect that an unhealthy level of contaminants is present in the air (e.g., a level exceeding a threshold), processor 1004 may cause the blower system 100 to operate in the air treatment mode, where the intensity of the UV light emitted by UV unit 118 is increased or the airflow is decreased. When the air quality returns to normal levels, processor 1004 is configured to cause blower system 100 to return to normal operation, such as by operating blower system 100 according to a command from the system controller. In some embodiments, the processor is configured to vary, for example, the intensity of UV light emitted by UV unit 118 or the speed of blower wheel 102 based on data received from sensor module 1202 according to one or more algorithms stored in a memory of motor controller 114. In some embodiments, if processor 1004 determines that the air quality is unhealthy, processor 1004 is configured to cause an alert message to be displayed, for example, at the system controller or via the app at the user device.

In some embodiments, blower system 100 further includes an electrostatic filtration device configured to remove contaminants from air moving through the blower system 100. The electrostatic filtration device includes two electrodes coupled respectively to a ground and a high voltage of a DC power supply, which may be provided, for example, by motor controller 114. In some embodiments, the electrostatic filtration device is integrated into other parts of blower system 100 such as, for example, on blower wheel 102 or on individual blades of blower wheel 102. In some embodiments, the electrostatic filtration device is implemented as a mesh extending across at least a portion of the flow path of blower system 100. In some embodiments, blower system 100 or an HVAC system in which blower system 100 is installed, may further include one or more traditional air or fluid filters in addition to, or as an alternative to, the electrostatic filtration device. The traditional filters may include, for example, a fibrous or porous material capable of removing contaminants from air moving through blower system 100. In some embodiments, the electrostatic filtration device or traditional filter may be placed such that UV unit 118 may treat matter captured by the electrostatic filtration device or traditional filter, such as by killing pathogens captured in the filter. For example, the electrostatic filtration device or traditional filter may be placed at inlet 106 or outlet 108.

In some embodiments, blower system 100 further includes an ion generator. The ion generator may be disposed, for example, within blower housing 104 to treat air moving through blower housing 104. In some such embodiments, the ion generator is configured to be controlled by motor controller 116, for example, based on a detected level of contaminants or a current operating mode of blower system 100. In certain embodiments, blower system 100 may include one or more of UV unit 118, the electrostatic filtration device and the ion generator. For example, in some such embodiments, the ion generator may be used in conjunction with or without the electrostatic filtration device, and no UV unit 118 is present.

In some embodiments, electric motor 110, motor controller 114, and one or more of sensor module 1202, UV unit 118, or other components of blower system 100 may be integrated into a single motor package. Accordingly, a legacy blower system can be upgraded to include air quality control capabilities by replacing an original equipment manufacturer (OEM) motor of the legacy blower system with the single motor package.

Figure 14:
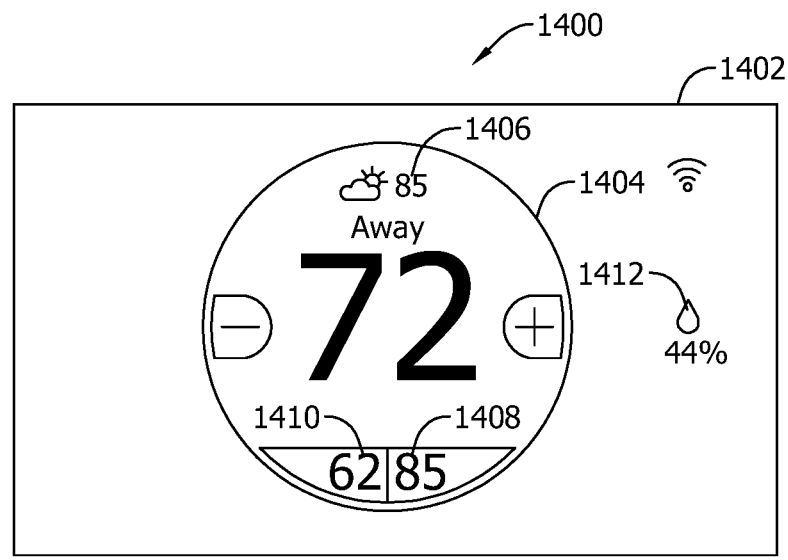
FIG. 14 is a graphical illustration of an example user interface for a system controller for use with the fluid moving systems, active cleaning devices, and electric motors shown in FIGS. 1-12.

FIG. 14 depicts an exemplary user interface 1400. In some embodiments, processor 1004 is configured to cause user interface 1400 to be displayed, for example, via an app or web page displayed on a user device. As illustrated in FIG. 14, in some embodiments, user interface 1400 includes a virtual thermostat 1402 that enables a user to, for example, view a current temperature setting 1404 and to adjust the current temperature setting. In some embodiments, user interface 1400 further includes information about current temperature or weather conditions such as, for example, a current outdoor temperature 1406, a daily high temperature 1408, a daily low temperature 1410, and a chance of precipitation 1412. In some embodiments, the current temperature and weather conditions are retrieved by processor 1004 via the Internet.

Figure 15:
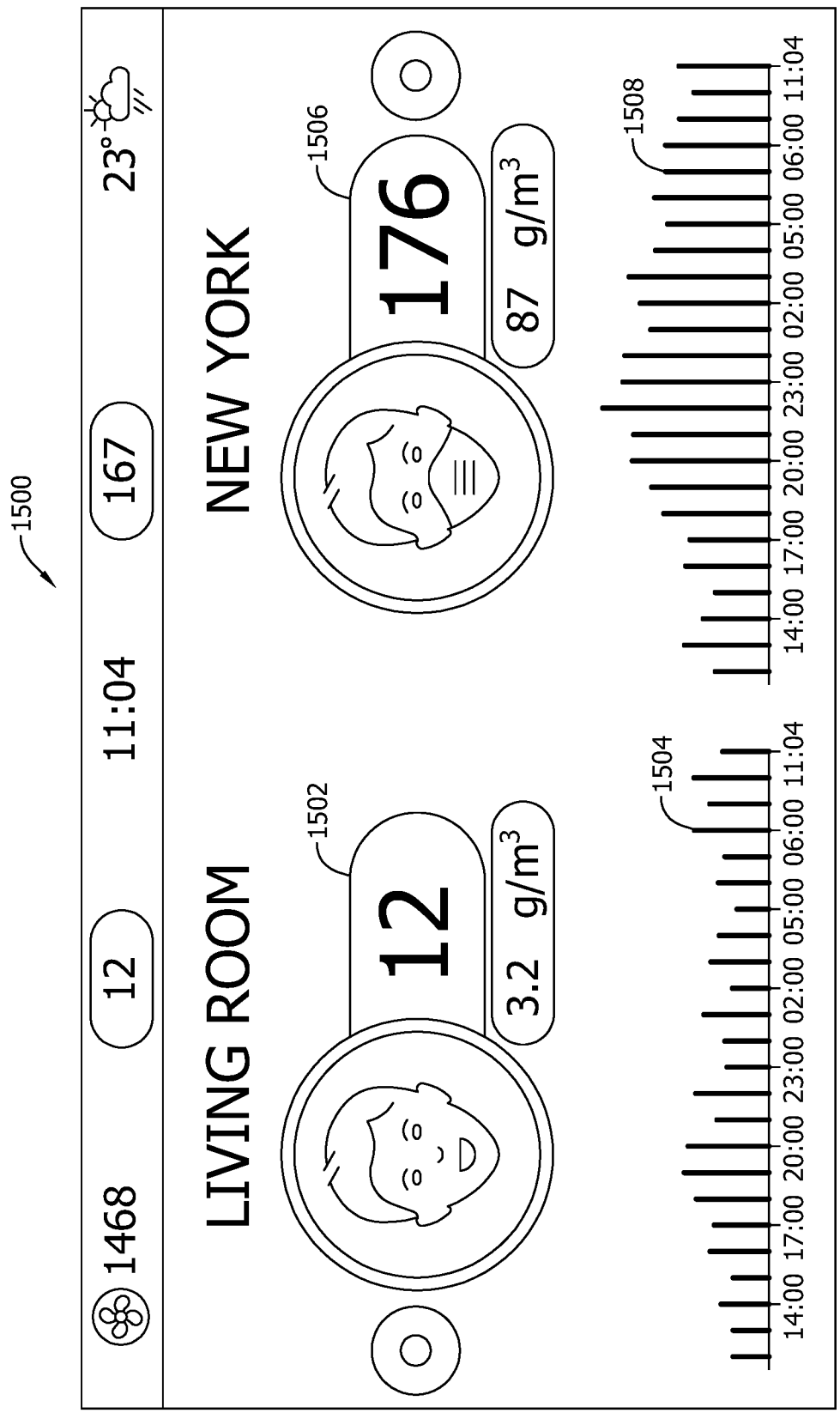
FIG. 15 is a graphical illustration of another example user interface for a system controller for use with the fluid moving systems, active cleaning devices, and electric motors shown in FIGS. 1-12.

FIG. 15 depicts another exemplary user interface 1500. Like user interface 1400, in some embodiments, processor 1004 is configured to cause user interface 1500 to be displayed, for example, via an app or web page displayed on a user device. As illustrated in FIG. 15, in some embodiments, user interface 1500 is configured to include air quality data, such as particulate matter data, for different times at multiple locations. For example, in some embodiments, user interface 1500 includes a current indoor particulate matter level 1502, historical indoor particulate matter levels 1504, a current outdoor particulate matter level 1506, and historical outdoor particulate matter levels 1508. In some such embodiments, the user interface further includes an indicator of current air quality, for example, whether the current air quality is health or unhealthy.

Figure 16:
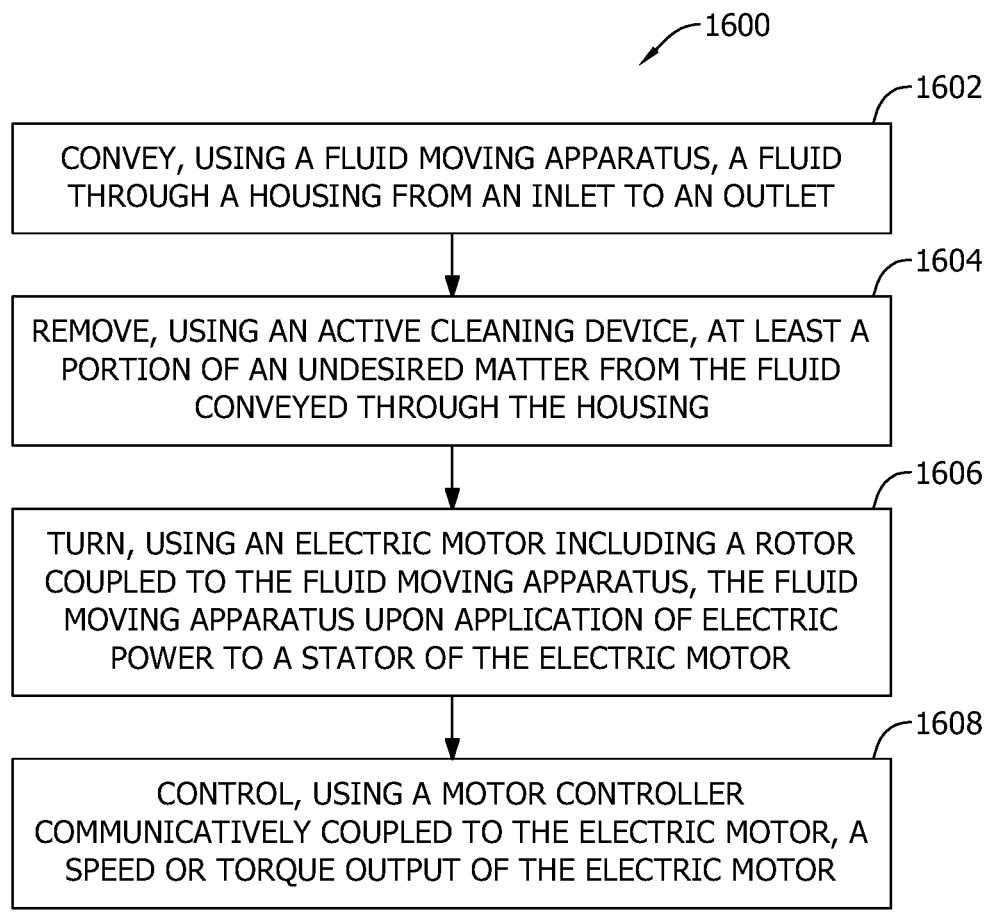
FIG. 16 is a flowchart of an exemplary method for operating a blower system.

FIG. 16 illustrates an exemplary method 1600 for operating blower system 100. Blower system 100 conveys 1602, using blower wheel 102, a fluid through blower housing 104 from inlet 106 to outlet 108. Blower system 100 also removes 1604, using UV unit 118, at least a portion of an undesired matter from the fluid conveyed through blower housing 104. Blower system also 100 turns 1606, using electric motor 110 including a rotor coupled to blower wheel 102, blower wheel 102 upon application of electric power to a stator of electric motor 110. Blower system 100 also controls 1608, using motor controller 114 communicatively coupled to electric motor 110, at least one of a speed output or a torque output of electric motor 110.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Disjunctive language such as the phrase "at least one of X, Y, or Z," unless specifically stated otherwise, is generally understood within the context as used to state that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fluid moving system, comprising:
   a fluid moving apparatus configured to convey a fluid through a housing from an inlet to an outlet;

an active cleaning device configured to neutralize or remove at least a portion of an undesired matter from the fluid conveyed through the housing, wherein said active cleaning device is communicatively coupled to a system controller;

an electric motor including a rotor coupled to said fluid moving apparatus and configured to turn said fluid moving apparatus upon application of electric power to a stator of said electric motor; and a motor controller communicatively coupled to said electric motor and configured to control at least one of a speed output or a torque output thereof, said motor controller separate from the system controller, wherein said active cleaning device is further communicatively coupled to said motor controller and configured to operate based on a control signal received from the system controller or said motor controller.

2. The fluid moving system of claim 1 further comprising a sensor positioned proximate said fluid moving apparatus and communicatively coupled to said motor controller, said sensor configured to measure a quality of the fluid conveyed through the housing, and wherein said motor controller is further configured to control the speed or torque output of the electric motor based on the measured quality.

3. The fluid moving system of claim 2, wherein said motor controller is further configured to periodically operate the fluid moving apparatus to circulate the fluid within a proximity of the sensor.

4. The fluid moving system of claim 2, further comprising a motor controller housing, wherein said motor controller is disposed in said motor controller housing, and wherein said sensor is attached to said motor controller housing.

5. The fluid moving system of claim 2, and wherein said motor controller or the system controller is configured to control operation of said active cleaning device to at least one of activate, deactivate, or change in intensity based on the measured quality.

6. The fluid moving system of claim 1, wherein said motor controller comprises a mechanism configured to prevent said active cleaning device from operating when said electric motor is inactive.

7. The fluid moving system of claim 1, wherein said active cleaning device comprises an ultraviolet light source.

8. The fluid moving system of claim 7, wherein said ultraviolet light source comprises a light emitting diode.

9. The fluid moving apparatus of claim 7, wherein said ultraviolet light source is configured to emit Ultra Violet C radiation through the fluid conveyed through the housing.

10. The fluid moving system of claim 1, wherein said active cleaning device comprises at least one of an electrostatic filtration device or an ion generator.

11. The fluid moving system of claim 1, wherein said motor controller is configured to operate according to a plurality of operating modes corresponding to a plurality of controlled speed or torque outputs of said electric motor.

12. The fluid moving system of claim 11, and wherein said motor controller or the system controller is configured to control operation of said active cleaning device to at least one of activate, deactivate, or change in intensity based on the operating modes.

13. The fluid moving system of claim 1, wherein said fluid moving apparatus comprises a blower wheel comprising backward-curved blades, said backward-curved blades configured to reduce an accumulation of the undesired matter on said backward curved blades.

14. The fluid moving system of claim 1, further comprising a baffle disposed in the housing, wherein the fluid moving apparatus is further configured to convey the fluid about the baffle.

15. The fluid moving system of claim 14, wherein said active cleaning device is disposed on said baffle.

16. A heating, ventilation, and air conditioning (HVAC) system comprising:
    a fluid conduit; and
    a fluid moving system coupled in flow communication with said fluid conduit, said fluid moving system comprising:
        a fluid moving apparatus configured to convey a fluid through a housing from an inlet to an outlet, at least one of the inlet and the outlet coupled in flow communication with said fluid conduit;
        an active cleaning device configured to neutralize or remove at least a portion of an undesired matter from the fluid conveyed through the housing, wherein said active cleaning device is communicatively coupled to a system controller;
        an electric motor including a rotor coupled to said fluid moving apparatus and configured to turn said fluid moving apparatus upon application of electric power to a stator of said electric motor; and
        a motor controller communicatively coupled to said electric motor and configured to control at least one of a speed output or a torque output thereof, said motor controller separate from the system controller, wherein said active cleaning device is further communicatively coupled to said motor controller and configured to operate based on a control signal received from the system controller or said motor controller.

17. The HVAC system of claim 16, wherein said active cleaning device is disposed in said fluid conduit.

18. The HVAC system of claim 16, wherein said motor controller is configured to operate according to a plurality of operating modes corresponding to a plurality of controlled speed or torque outputs of said electric motor, the plurality of operating modes including at least one of a heating mode, a cooling mode, or a constant fan mode.

* * * * *